(12) United States Patent
Dontcheva et al.

(10) Patent No.: US 9,465,785 B2
(45) Date of Patent: Oct. 11, 2016

(54) METHODS AND APPARATUS FOR COMIC CREATION

(75) Inventors: Lubomira A. Dontcheva, San Francisco, CA (US); Daniel C. Ritchie, Stanford, CA (US)

(73) Assignee: Adobe Systems Incorporated, San Jose, CA (US)

( * ) Notice: Subject to any disclaimer, the term of this patent is extended or adjusted under 35 U.S.C. 154(b) by 637 days.

(21) Appl. No.: 13/594,381

(22) Filed: Aug. 24, 2012

(65) Prior Publication Data

US 2013/0073952 A1     Mar. 21, 2013

Related U.S. Application Data

(60) Provisional application No. 61/535,791, filed on Sep. 16, 2011.

(51) Int. Cl.
    *G06F 17/24*           (2006.01)

(52) U.S. Cl.
    CPC ................... *G06F 17/242* (2013.01)

(58) Field of Classification Search
    CPC .. G06F 17/242; G06F 3/04883; G06K 9/222
    USPC .................. 715/802, 246, 764, 772; 345/473
    See application file for complete search history.

(56) References Cited

U.S. PATENT DOCUMENTS

| | | | | |
|---|---|---|---|---|
| 6,232,966 | B1 * | 5/2001 | Kurlander ..................... | 715/764 |
| 7,882,129 | B1 * | 2/2011 | Williams ...................... | 707/780 |
| 2002/0184254 | A1 * | 12/2002 | Williams et al. ............. | 707/500 |
| 2003/0016247 | A1 * | 1/2003 | Lai et al. ..................... | 345/764 |
| 2005/0039138 | A1 * | 2/2005 | Urbina ......................... | 715/802 |
| 2005/0120289 | A1 * | 6/2005 | Suzuki ......................... | 715/500 |
| 2005/0147300 | A1 * | 7/2005 | Dresevic et al. ............. | 382/186 |
| 2005/0210008 | A1 * | 9/2005 | Tran et al. ......................... | 707/3 |
| 2005/0234738 | A1 * | 10/2005 | Hodes ............................... | 705/1 |
| 2006/0098282 | A1 * | 5/2006 | McCart et al. ............... | 359/472 |
| 2006/0136221 | A1 * | 6/2006 | James et al. .................. | 704/275 |

(Continued)

FOREIGN PATENT DOCUMENTS

EP          1729225 A2 * 12/2006          G06K 9/00469

OTHER PUBLICATIONS

Anh Khoi Ngo Ho, Comics Page Structure Analysis Based on Automatic Panel Extraction, Jan. 2011, ResearchGate.*

(Continued)

*Primary Examiner* — Andrew Dyer
*Assistant Examiner* — Ahmad M El-Bkaily
(74) *Attorney, Agent, or Firm* — Wolfe-SBMC

(57) ABSTRACT

In embodiments of comic creation, a digital sketching system may provide various tools for creating and modifying comics consisting of one or more panels, and for creating, adding, and modifying text in the panels. This system, which may be referred to as a comic creation application, may be implemented according to a domain-specific digital sketchbook paradigm that is directed specifically to the needs of a comic artist. The comic creation application may be tailored for comics planning, may be designed with the structure of comic pages in mind, and may provide high-level editing tools and operations for this structure. The system may make a digital device (e.g., a touch- or multitouch-enabled device) an intelligent participant in the creative process, rather than a passive sketchbook, to facilitate story building in ways that pencil and paper cannot.

21 Claims, 15 Drawing Sheets

(56) References Cited

U.S. PATENT DOCUMENTS

| | | | |
|---|---|---|---|
| 2006/0274057 A1* | 12/2006 | Van Ness | G06F 3/04883 345/179 |
| 2007/0078886 A1* | 4/2007 | Rivette et al. | 707/102 |
| 2007/0168852 A1* | 7/2007 | Erol et al. | 715/500.1 |
| 2007/0208719 A1* | 9/2007 | Tran | 707/3 |
| 2008/0200191 A1* | 8/2008 | Rao et al. | 455/466 |
| 2008/0210475 A1* | 9/2008 | Silverman | G06F 3/04883 178/19.01 |
| 2008/0235564 A1* | 9/2008 | Erol et al. | 715/202 |
| 2008/0301578 A1* | 12/2008 | Olson | G06F 17/30905 715/802 |
| 2009/0041352 A1* | 2/2009 | Okamoto | 382/176 |
| 2009/0150760 A1* | 6/2009 | Winkler | A63F 13/00 715/202 |
| 2009/0210396 A1* | 8/2009 | Satoh | 707/3 |
| 2009/0276694 A1* | 11/2009 | Henry et al. | 715/243 |
| 2010/0110080 A1* | 5/2010 | Goodinson | 345/467 |
| 2010/0250340 A1* | 9/2010 | Lee et al. | 705/10 |
| 2010/0325571 A1* | 12/2010 | Kodosky et al. | 715/772 |
| 2011/0007078 A1* | 1/2011 | Cao et al. | 345/473 |
| 2011/0138271 A1* | 6/2011 | Tobita | G06T 11/60 715/246 |
| 2011/0181604 A1* | 7/2011 | Lee et al. | 345/473 |
| 2012/0017144 A1* | 1/2012 | Nonaka | 715/243 |
| 2013/0073952 A1* | 3/2013 | Dontcheva et al. | 715/246 |

OTHER PUBLICATIONS

Autodesk SketchBook Pro Brochure, "Draw, Sketch, Paint and Express your Ideas, 2009 Autodesk, Inc., 2 pages".

"Autodesk SketchBook Pro 2011 Software; Questions and Answers," www.autodesk.com/sketchbook, 2010 Autodesk, Inc., 4 pages.

Adobe, "Capture and explore creative ideas anywhere you go," Adobe Ideas 1.01 Homepage Oct. 10, 2010, Web page from http://web.archive.org/web/20101024201539/http://www.adobe.com/products/adobeideas, 2 pgs.

* cited by examiner panel 400 panel 400 panel 500 panel 500

METHODS AND APPARATUS FOR COMIC CREATION

PRIORITY INFORMATION

This application claims benefit of priority of U.S. Patent Application Ser. No. 61/535,791 entitled "Methods and Apparatus for Comic Creation" filed Sep. 16, 2011, the content of which is incorporated by reference herein in its entirety.

BACKGROUND

1. Description of the Related Art

The workflow for creating a comic page is typically divided into the following stages: pencils, inks, colors, and letters. However, before any of this final artwork can be produced, the artist has to go through a planning stage, doing a lot of rough work to define how the page will look. For many comic creators, a large chunk of this planning work involves creating thumbnails. These are rough, simplified versions of the panels on a page. The artist may draw many different thumbnails for a single page, experimenting with layout, framing, timing, and other variables until the flow of the page feels right.

There are conventional digital comic creation tools that are designed for causal users, and as such generally provide predefined templates of fixed panels into which users can copy bitmap images (e.g., digital photos) and add filters and text to, for example, quickly turn a photo album into a comic. However, these tools are generally not well suited for the creation of original, sketch-based comics by more sophisticated comic artists.

Many or most comic artists currently use pencil and paper for early-stage comic planning work. However, while these might currently be the tools of choice for comic planning, pencil and paper have their own problems. Making small edits often requires starting over from scratch, which makes it difficult to experiment with different design alternatives. Sketchbooks become a mess of scribbles and erasures; some artists talk about redrawing the same page dozens of times until it feels right.

There are a number of conventional digital sketching applications available for various computing platforms including tablet-type computing devices. These conventional digital sketching applications generally support freehand drawing and erasing. However, these conventional digital sketching applications are general-purpose sketching tools that treat the device as really nothing more than a digital piece of paper.

2. Touch and multitouch technologies

Conventional touch-enabled technologies (e.g. a computer touchpad, ATM screen, etc) recognize only one touch point. Multitouch is a technology that provides hardware and software that allows computer users to control various applications via the manipulation of multiple digits on the surface of (or, for some devices, proximate to) a multitouch-enabled device. Multitouch technology generally consists of a touch-enabled device (referred to as a multitouch device) such as a touch-sensitive display device (computer display, screen, table, wall, etc.), touchpad, tablet, smartphone, etc., as well as software that recognizes multiple, substantially simultaneous touch points on the surface of the multitouch device. A multitouch device may be a direct or absolute touch device in which the touch points are applied directly to a display device, or an indirect or relative touch device in which the touch points are applied to a pad or tablet and mapped to a display device.

SUMMARY

Various embodiments of methods and apparatus for comic creation are described. Embodiments of a digital sketching system are described that may provide various tools for creating and modifying comics consisting of one or more panels containing comic sketches, and for creating, adding, and modifying text in the panels. Embodiments may be implemented according to a domain-specific digital sketchbook paradigm that is directed specifically to the needs of a comic artist. This digital sketching system may be referred to as a domain-specific comic creation module or application, or simply comic creation application. Domain-specific means that the comic creation application is tailored for comics planning: the application is designed with the structure of comic pages in mind, and provides high-level editing tools and operations for this structure. A goal is to make the digital device (e.g., a touch- or multitouch-enabled tablet device) an intelligent participant in the creative process, rather than a passive sketchbook, to facilitate story building in ways that pencil and paper cannot.

Embodiments of the comic creation application may include, but are not limited to, the following functionalities. Embodiments may allow a user to create and manipulate panels. Panels are the basic building blocks of comics, so the comic creation application treats panels as first-class objects. Adhering to a "sketch-based" design principle, the comic creation application lets the user directly draw and modify panels of any shape and size, rather than simply placing pre-made boxes. Standard touch gestures may be supported that, for example, allow zooming in on a panel to work on it in detail. The comic creation application provides a vector-based drawing tool for sketching, and therefore zooming does not lose resolution, as it would for bitmap images. The user can sketch and erase inside a panel, and the resulting drawings are 'owned' by the respective panel, which is important in supporting the manipulation of panels. Drawing/sketching may be performed, for example, using a standard stylus or similar device, and/or using one or more digits.

In at least some embodiments, the comic creation application may be implemented on a device that supports touch or multitouch technology, and may provide a user interface that supports several touch and/or multitouch gestures for performing various sketching and object manipulation functions when creating comics. In particular, embodiments of the comic creation application may be directed to multi-touch-enabled tablet devices; however, it is to be noted that embodiments may be implemented on other types of computing devices.

Embodiments of the comic creation application may provide various tools, via a user interface, that are designed specifically for comic artists. The tools may include, but are not limited to, tools for creating and modifying vector graphics-based sketches, tools for creating and modifying panels to create desired comic formats, and tools for easily entering text and embedding the text into the vector-based graphics in appropriate panels. At least some embodiments may also provide a readability review tool that analyzes the organization of the panels in a comic and/or the organization of the text boxes in the panels of a comic to heuristically determine if the objects are arranged in a natural (e.g., English language) reading order and makes suggestions on how the organization of the objects in the comic may be rearranged to make the comic more naturally readable.

Embodiments of the comic creation application may thus provide a digital sketching tool with powerful domain-specific features for comic artists that, while applicable on many types of computing devices, is particularly directed to multitouch-enabled tablet-type devices. However, it is to be noted that the "domain-specific sketchbook" concept may be applied to prototyping or other tasks in other creative domains, such as interaction design and storyboarding for film and video. Embodiments of the comic creation application and other "domain-specific sketchbooks" may, for example, be released as stand-alone applications or as add-ons to existing tools.

Figure 1:
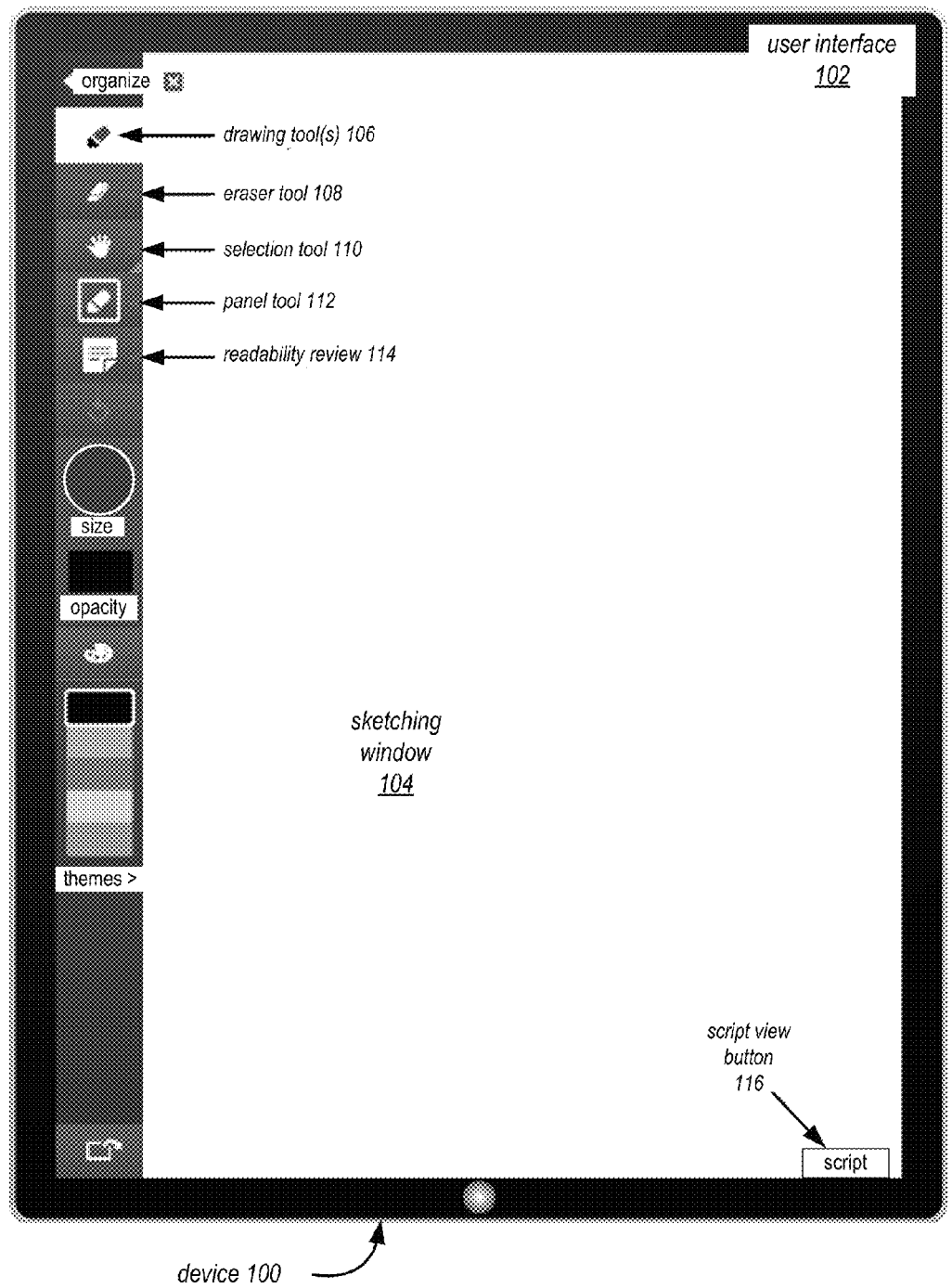
FIG. 1 illustrates an example device and example user interface to an embodiment of the comic creation application.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for comic creation are described. As previously mentioned, the early planning and rough work stages of comic creation are generally still performed using "analog" tools (i.e., pencil and paper), but paper and pencil sketching has problems including the difficulty in making small edits and the need to often redraw the same page multiple times. Computational tools could alleviate some of these issues, and in particular multitouch-enabled tablet-type computing devices may provide a digital alternative to the traditional sketchbook. Conventional digital sketching applications are available, but are general-purpose sketching tools that treat the device as really nothing more than a digital piece of paper.

Embodiments of a digital sketching system are described that may provide various tools for creating and modifying comics consisting of one or more panels, and for creating, adding, and modifying text in the panels. Embodiments may be implemented according to a domain-specific digital sketchbook paradigm that is directed specifically to the needs of a comic artist. This digital sketching system may be referred to as a domain-specific comic creation module or application, or simply comic creation application. Domain-specific means that the comic creation application is tailored for comics planning: the application is designed with the structure of comic pages in mind, and provides high-level editing tools and operations for this structure. A goal is to make the digital device (e.g., a multitouch-enabled tablet device) an intelligent participant in the creative process, rather than a passive sketchbook, to facilitate story building in ways that pencil and paper cannot.

In at least some embodiments, underlying design principles for the comic creation application may include, but are not limited to, the following:

Simplicity—provide a minimum of drawing features; avoid complex image manipulations.

Sketch-based—content should begin as freehand drawing, no matter how it's manipulated later.

Support easy text manipulation—provide easy tools for manipulating text as well as drawings.

Given these design principles, embodiments of the comic creation application may include, but are not limited to, the following functionalities:

Panels are the basic building blocks of comics, so the comic creation application treats panels as first-class objects. Adhering to the "sketch-based" design principle, the comic creation application lets the user directly draw panels of any shape and size and at any location, including overlapping panels and panels with gaps in the border, rather than simply placing pre-made boxes.

Touch and/or multitouch gestures may be supported that, for example, allow zooming in on a panel to work on it in detail, zooming back out to view the comic page as a whole, and moving the displayed page to see and work on another portion of the page. The comic creation application provides a vector-based drawing tool for sketching, and therefore zooming in does not lose resolution, as it would for bitmap images.

The user can sketch, paint, and erase inside a panel, and the resulting drawings are 'owned' by the respective panel, which is important in supporting the manipulation of panels. Note that the user can also draw a stroke across the border of a panel; in at least some embodiments, a windowing algorithm is provided that determines what strokes or portions of strokes are to be shown or displayed. The windowing algorithm supports gaps in panel borders by allowing strokes that pass through the gaps, and any strokes outside the panel that touch such a stroke, to be displayed. The windowing algorithm may be applied when a panel including sketch content is created as well as when a panel including sketch content is modified (e.g., resized, or when a portion of the border is erased). The windowing algorithm may be applied in response to user input specifying that it is to be applied to one or more panels, or in some cases may be automatically applied in response to a user action such as resizing a panel or erasing a portion of a panel's border.

The user can drag-and-drop text elements from a script view into panels. The text may be automatically placed within a text box in the respective panel. The text box may be fitted to the text. The text box may be modifiable just like any other object (sketches, panels, etc.) in the window. For example, gestures may be used to resize or move a text box within a panel, or to move a text box to another panel.

Drawing/sketching may be performed using a standard stylus or similar device, for example a commercially available, inexpensive capacitive stylus. Drawing using a digit or digits may also be supported in some embodiments.

In at least some embodiments, the comic creation application may be implemented on a device that supports multitouch technology, and may provide a user interface that supports several touch and/or multitouch gestures for performing various sketching and object manipulation functions when creating or modifying comics. In particular, embodiments of the comic creation application may be directed to multitouch-enabled tablet devices; however, it is to be noted that embodiments may be implemented on other types of computing devices.

Embodiments of the comic creation application may provide various tools, via a user interface, that are designed specifically for comic artists. The tools may include, but are not limited to, tools for creating and modifying vector-based sketches, tools for creating and modifying panels to create desired comic formats, and tools for easily entering text and embedding the text into the vector-based graphics in appropriate panels. At least some embodiments may also provide a readability review tool that analyzes the organization of the panels in a comic and/or the organization of the text boxes in the panels of a comic to heuristically determine if the objects are arranged in a natural (e.g., English language) reading order and makes suggestions on how the organization of the objects in the comic may be rearranged to make the comic more naturally readable.

Embodiments of the comic creation application may thus provide a digital sketching tool with powerful domain-specific features for comic artists that, while applicable on many types of computing devices, is particularly directed to tablet-type devices. However, it is to be noted that the "domain-specific sketchbook" concept may be applied to prototyping or other tasks in other creative domains, such as interaction design and storyboarding for film and video.

Embodiments of the comic creation application or module and other "domain-specific sketchbooks" may, for example, be implemented as stand-alone applications or as add-ons or plug-ins to tools including but not limited to general-purpose sketching applications such as Adobe® Ideas®. "Adobe" and "Adobe Ideas" are either registered trademarks or trademarks of Adobe Systems Incorporated in the United States and/or other countries.

Figure 13:
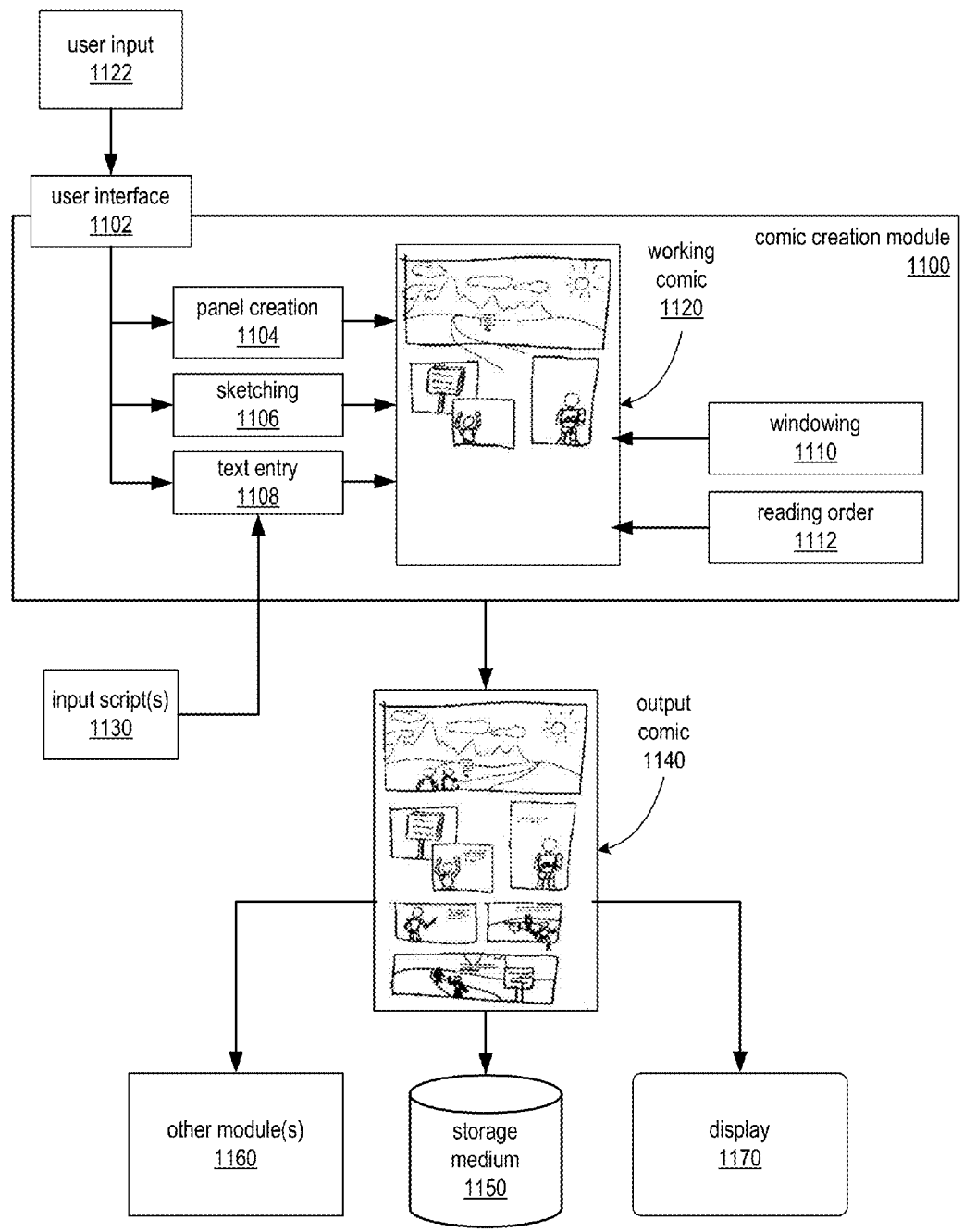
FIG. 13 illustrates a module that may implement a comic creation method, according to some embodiments.
Figure 14:
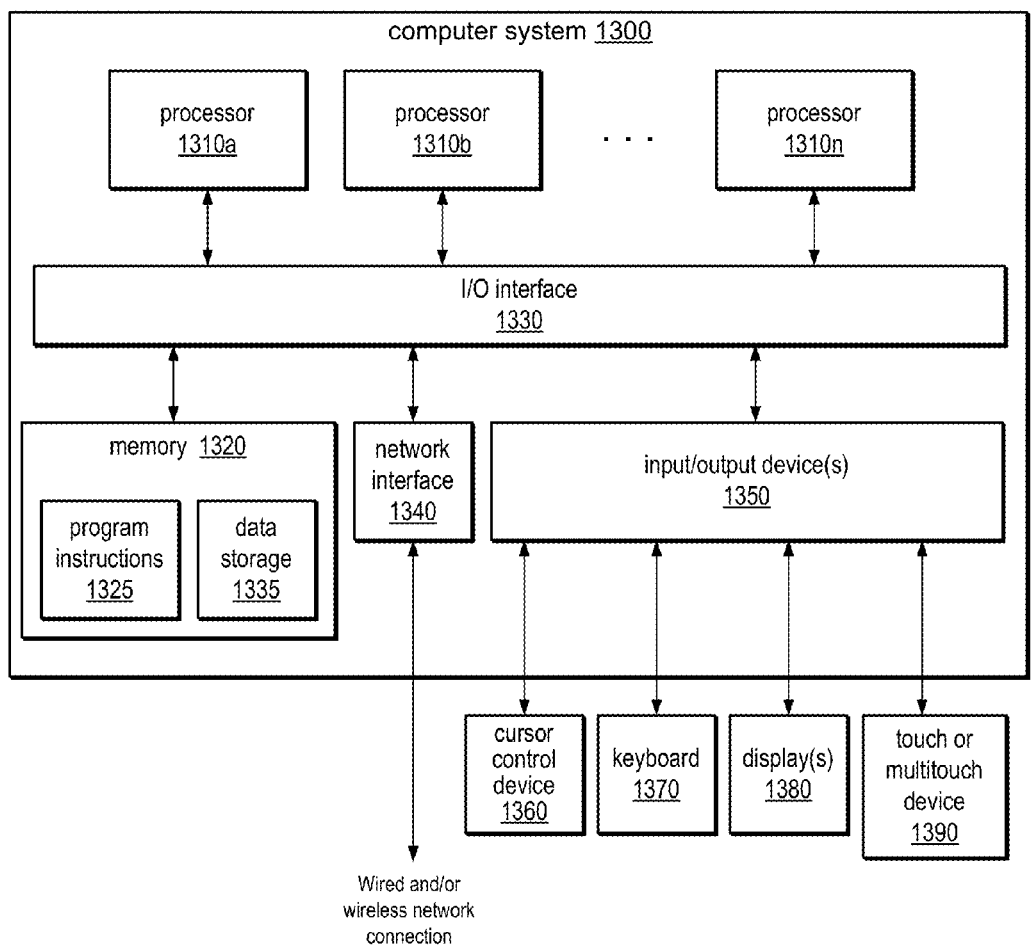
FIG. 14 illustrates an example computer system that may be used in embodiments.

FIG. 1 illustrates an example device and example user interface to an embodiment of the comic creation application. Device 100 may be any touch- or multitouch-enabled computing device, for example a desktop, laptop, or notebook computer, a tablet, pad or notepad-type device, an e-book, a cell phone, a smart phone, a personal digital assistant (PDA), or in general any computing device that may display and process graphical objects and that supports touch or multitouch functionality via a touch- or multitouch-enabled display screen, pad and/or tablet. The device 100 may be a direct or absolute touch device in which the touch point(s) are applied directly to a display screen with a digit, stylus, or pen, or an indirect or relative touch device in which the touch point(s) are applied to a pad or tablet with a digit, stylus, or pen and mapped to a display screen. An embodiment of the comic creation application or module as described herein is illustrated in FIG. 13. An example system on which the comic creation application or module may be implemented is shown in FIG. 14.

While embodiments of the comic creation application are generally described herein as executing on a multitouch-enabled device 100, note that embodiments may also be implemented on touch-enabled devices and/or on devices that are not touch- or multitouch-enabled devices. On those devices, the multitouch gestures described herein may be replaced, for example, with analogous touch gestures and/or mouse/cursor control techniques.

FIG. 1 shows an example user interface 102 to the comic creation application and shows several example tools, work areas, and other user interface elements, according to at least some embodiments. In particular, FIG. 1 shows the comic creation application in sketching view mode. The sketching view shown in FIG. 1 may be considered the comic creation application's main screen, and most user interactions with the application may generally occur here. Note that the layout, labeling, and other aspects of this example user interface 102 are not intended to be limiting.

The user interface 102 may provide one or more of, but is not limited to, the following user interface elements:

Drawing tool 106—when selected, used to draw strokes into the currently active panel. In at least some embodiments, the active panel may be indicated by a gray background or through some other user interface method. In at least some embodiments, the user may double tap on a panel to make it active. Other methods for activating panels may be provided in some embodiments. While some embodiments may provide a single drawing tool (e.g., a pencil), at least some embodiments may allow the user to select a desired drawing tool from among two or more drawing tools such as pencils, pens, brushes, paint buckets, sprays, etc. Furthermore, at least some embodiments may allow the user to modify one or more aspects of a drawing tool, such as size, color, opacity, etc.

Eraser tool 108—when selected, used to erase sketch strokes from the active panel, or to erase portions of the active panel's border. At least some embodiments may allow the user to modify one or more aspects of the eraser tool, such as size.

Selection Tool 110—when selected, used to select object on the page for transformation, copying, deletion, etc. See the section titled Working with selections.

Panel tool 112—when selected, each shape drawn with this tool creates a new panel. See the section titled Working with Panels.

Readability review 114—selecting this user interface element shows the path a reader's eyes might take over the page and points out areas of potential confusion. See the section titled Readability review.

Script view button 116—selecting this user interface element opens/closes the script view for working with text scripts. See the section titled Script view.

In the interface for selecting strokes (selection tool 110), if the user draws a figure over a background, scribbling over that figure to select it may also grab some strokes from the background. Thus, in some embodiments, the time at which each stroke was drawn may be used to help distinguish what the user intended to select from what was incidentally selected.

In at least some embodiments, the user experience may be streamlined by removing the panel creation tool (panel tool 112) and instead using sketch recognition applied to input received by the drawing tool(s) 106 to infer when and where the user might have drawn a panel.

The user interface 102 may provide one or more other user interface elements than those listed above. For example, user interface 102 may provide a color palette whereby a user may select a color for the selected drawing tool, an opacity control whereby a user may change the opacity of the selected drawing tool and/or of a selected object, a size control whereby a user may change the size of the selected drawing tool and/or of a selected object, an undo/redo control, a themes menu or other user interface element that allows the user to select from among two or more themes, and in general any user interface element that may be useful in a comic sketching context.

Working with Selections

The static nature of paper makes experimentation risky and time-consuming. To eliminate these issues, embodiments of the comic creation application may allow users to select and manipulate anything that the user has drawn. In at least some embodiments, users can also quickly alter the visibility order of their drawings for total control over their layout. Planning sequences with some elements, such as backgrounds, can be tedious. In at least some embodiments of the comic creation application, a simple marking menu may be provided that lets a user copy and paste any object that the user has drawn or otherwise created.

Figure 2:
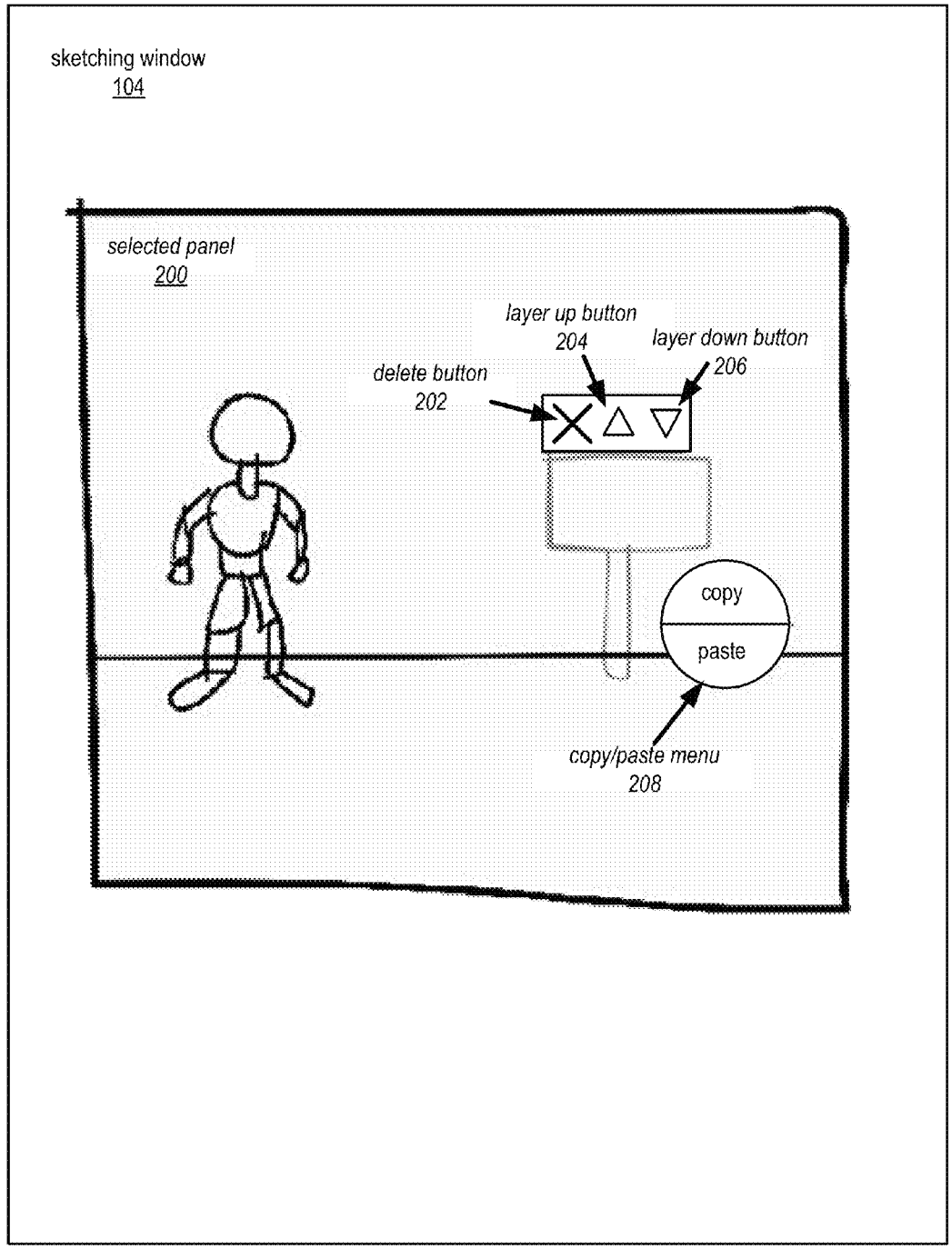
FIG. 2 shows an example of a selected panel according to at least some embodiments.

In at least some embodiments, when objects have been selected, additional editing options may become available, for example as illustrated in FIG. 2 which shows an example selected panel 200 with several displayed editing options as user interface elements, according to at least some embodiments. These additional editing options may include one or more of, but are not limited to:

Transformations—In at least some embodiments, selected objects (e.g., panels, text boxes, etc.) can be transformed using one or more of the following multitouch gestures. Note that some embodiments may support other touch, multitouch, or cursor control methods for performing these actions. Also note that these transformations and gestures are given as examples; other transformations and gestures may be supported in some embodiments:

Move: Two-finger drag.

Scale: Two-finger pinch (to reduce scale) or expand (to increase scale). In some embodiments, moving the fingers substantially horizontally or vertically increases or decreases the height or width of the panel, respectively, while moving the fingers substantially diagonally scales the panel on both axes.

Rotate: Two-finger rotate.

Delete button 202—deletes the current selection.

Layer up button 204—Moves the selected object up one visibility layer. This option may only be available when one object is selected.

Layer down button 206—Moves the selected object down one visibility layer. This option may only be available when one object is selected.

Copy/paste menu 208—In at least some embodiments, the user may press and hold anywhere on the page to open this menu. "Copy" copies the current selection. "Paste" inserts whatever was last copied, for example at the current location of the copy/paste menu 208.

Working with Panels

In comic creation, panels play an important role of framing particular moments, and in controlling the perceived timing and flow of the story. Embodiments of the comic creation application may provide features to make experimenting with choice of flow easier for the user. For example, in at least some embodiments, the user can switch on a mode where the panel acts as a window into its contents; any drawings that fall outside the panel's border are hidden. The user may then manipulate this window independently of the panel contents, experimenting with different views into the scene. In addition, in at least some embodiments, the user can also choose to "break" this window if desired, for example by erasing a part or parts of the panel's border. In at least some embodiments, erasing parts of the border of the panel allows the drawing to spill out of the window (see, e.g., FIGS. 5A and 5B).

FIGS. 3A-3B, 4A-4B, and 5A-5B illustrate several features designed to facilitate experimentation with page layout, according to at least some embodiments.

Figure 3A:
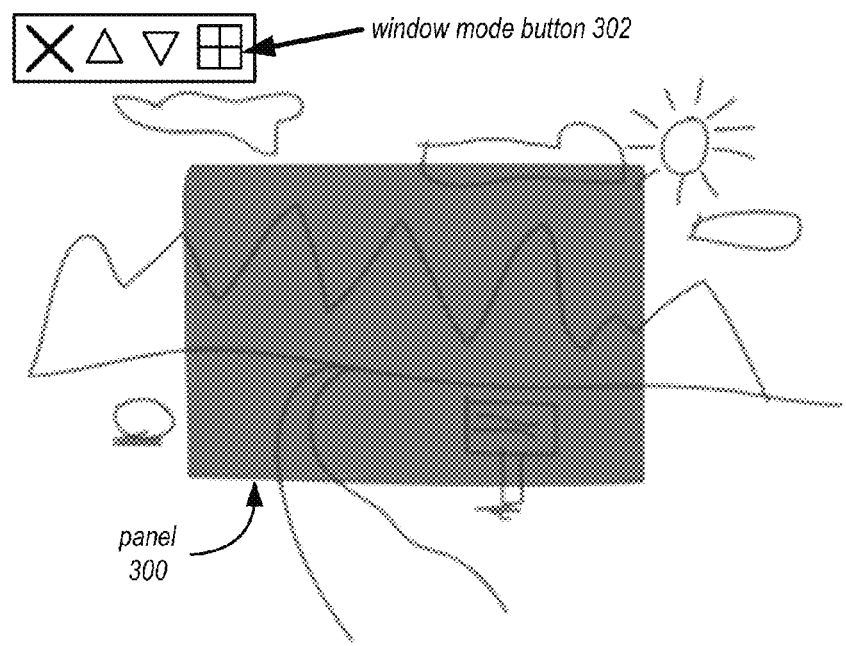
FIGS. 3A and 3B illustrate a window mode button, according to at least some embodiments.
Figure 3B:
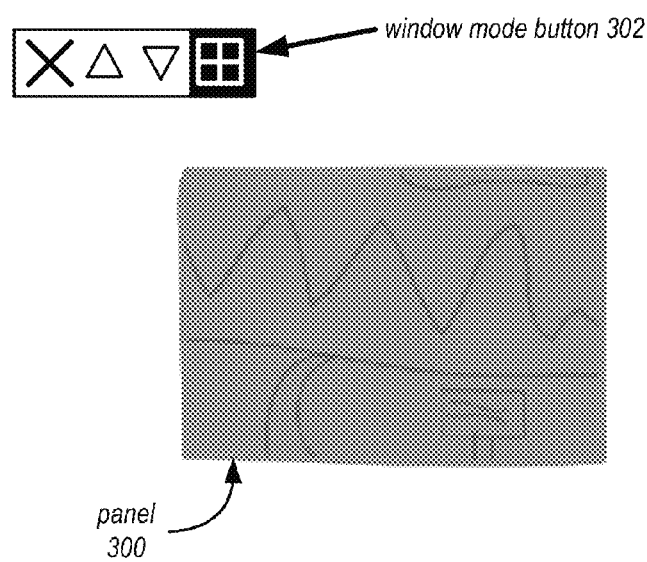

FIGS. 3A and 3B illustrate a window mode button 302, according to at least some embodiments. Pressing the window mode button 302 toggles whether the panel 300 is in or out of "window mode." In window mode, the panel acts as a window into its contents; any drawings that fall outside of the panel's border are hidden from view, as shown in FIG. 3B.

Figure 4A:
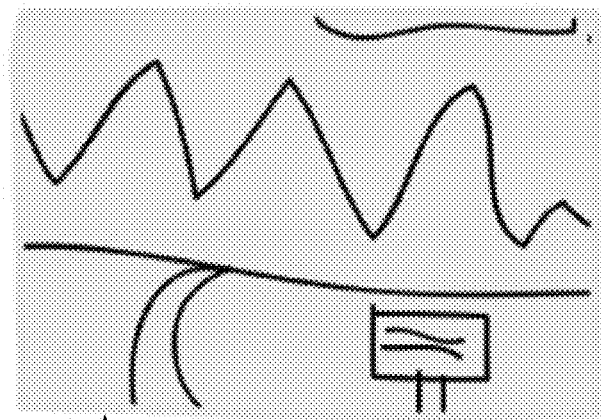
FIGS. 4A and 4B illustrate changing a window, according to at least some embodiments.
Figure 4B:
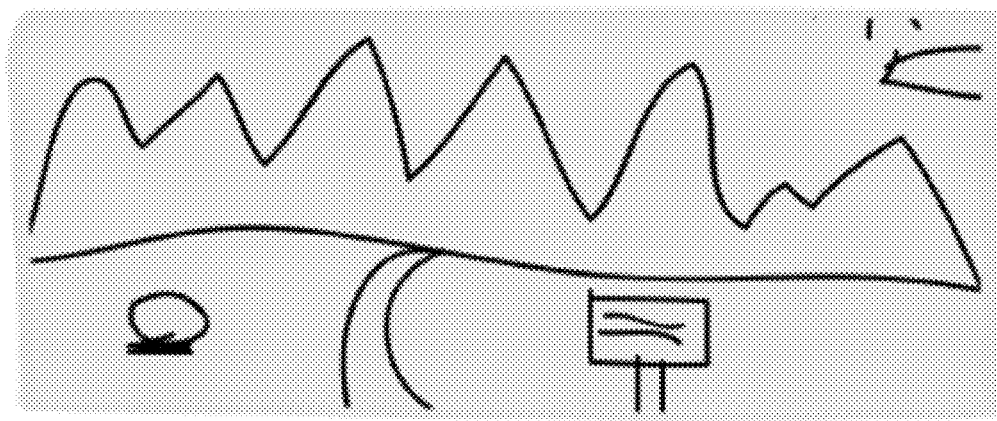

FIGS. 4A and 4B illustrate changing dimension, position, or shape of a window, according to at least some embodiments. With a panel 400 already selected (FIG. 4A), the user may use the selection tool to select just the border around the panel. The user may then use gestures to move, rotate, and scale the window independently of the panel contents. The user may thus use this feature to experiment with different views into a scene (see, e.g., FIG. 4B).

Figure 5A:
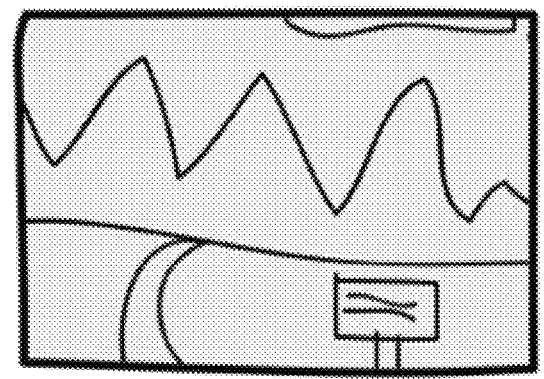
FIGS. 5A and 5B illustrate breaking a window by erasing a part of the border, according to at least some embodiments.
Figure 5B:
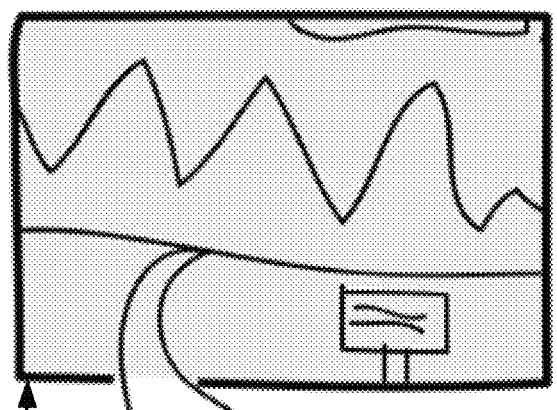

FIGS. 5A and 5B illustrate breaking a window by erasing part of the border, according to at least some embodiments. When the active panel 500 is in window mode, erasing at least a portion of the border around the window allows drawings to spill out of the window, as shown in FIG. 5B. In at least some embodiments, toggling the panel out of window mode restores the border to its original shape.

To perform the above window functions on panels, embodiments of the comic creation application may employ a windowing algorithm. A goal of the windowing algorithm is to decide which strokes should be shown and which should be considered outside the panel and hidden from view. An example windowing algorithm that may be used in at least some embodiments is given below. Note that this algorithm is not intended to be limiting:

Split strokes with the border.
Mark strokes inside the panel as shown.
Until no new strokes are marked as shown, perform:
    Mark any stroke that intersects a marked stroke as shown.
Mark all remaining strokes as not shown.
Remove strokes marked as not shown for final result.

Figure 6A:
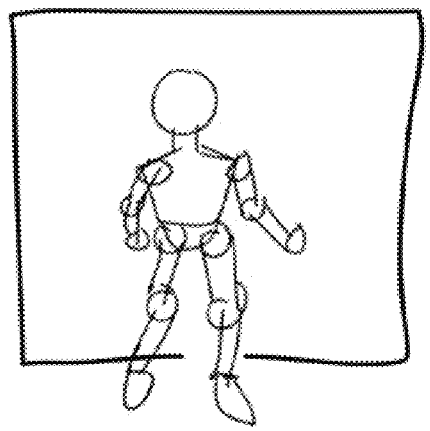
FIGS. 6A through 6D illustrate an example of applying the windowing algorithm to an example drawing in a panel, according to at least some embodiments.
Figure 6B:
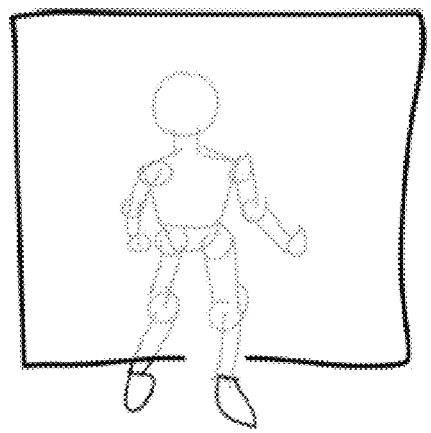
Figure 6C:
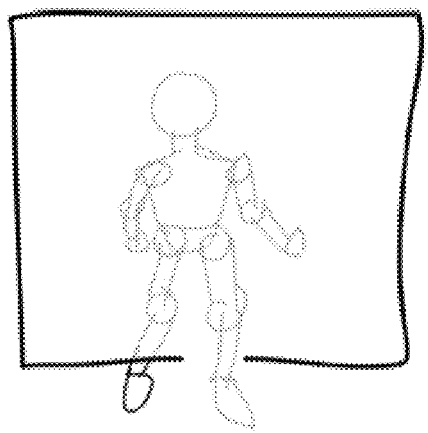
Figure 6D:
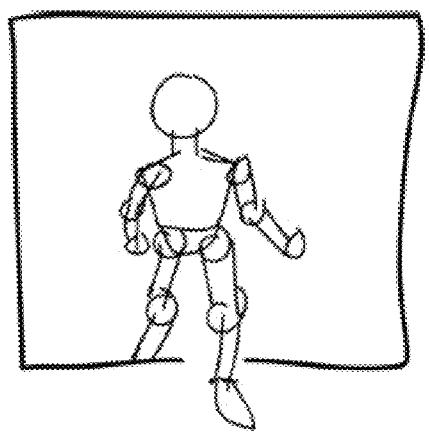

FIGS. 6A through 6D illustrate an example of applying the windowing algorithm to an example drawing in a panel, according to at least some embodiments. FIG. 6A shows the drawing in a panel. First, the windowing algorithm splits all strokes in the panel using the panel's border. The border is known because it's a special stroke that the user drew in order to create the panel in the first place. However, chunks may have been erased from it, as shown in this example. In this example, this splitting operation disconnects the character's right foot from its right leg. Next, the windowing algorithm marks all strokes that are at least partially inside the panel as "shown." These are strokes that the windowing algorithm has determined should be displayed. FIG. 6B shows the "shown" strokes as gray for illustrative purposes. Then, the windowing algorithm iteratively marks any strokes that intersect "shown" strokes as "shown" themselves. In this example, it only takes one pass to find all such strokes, which define the left foot of the character. FIG. 6C illustrates that the left foot is now also gray. Finally, the windowing algorithm marks all leftover strokes as "not shown" and discards them to get the final result, as illustrated in FIG. 6D.

Some embodiments may implement automatic page layout as an additional feature. Using automatic page layout, for example, if the user resizes (scales) a panel on a page, the other panels may automatically slide and resize to accommodate the change while preserving the overall layout. This may be a useful feature in many design domains.

Script View

The importance of text is one of the above-noted design principles, and in at least some embodiments may be addressed by including a script view in the comic creation application. In at least some embodiments, the script view allows the user to download, import, or otherwise obtain text files ("scripts") that are locally or remotely stored, for example download scripts stored in a Dropbox™ or similar web storage account. Dropbox™ is a registered trademark of Dropbox, Inc. In at least some embodiments, simple text analysis may be applied to segment the script into different regions, identifying dialogue spoken by different characters in the process. In at least some embodiments, the user can drag and drop these speaker segments directly into the drawing page. In at least some embodiments, the resulting word boxes can be selected and manipulated using techniques similar to those used to select and manipulate drawings and panels, for example using the same set of touch gestures. In at least some embodiments, the script can also be edited right on the device, and any edits made to the script may propagate to text that's already in the drawing. The script view thus allows easy integration of a text script with drawings.

Figure 7:
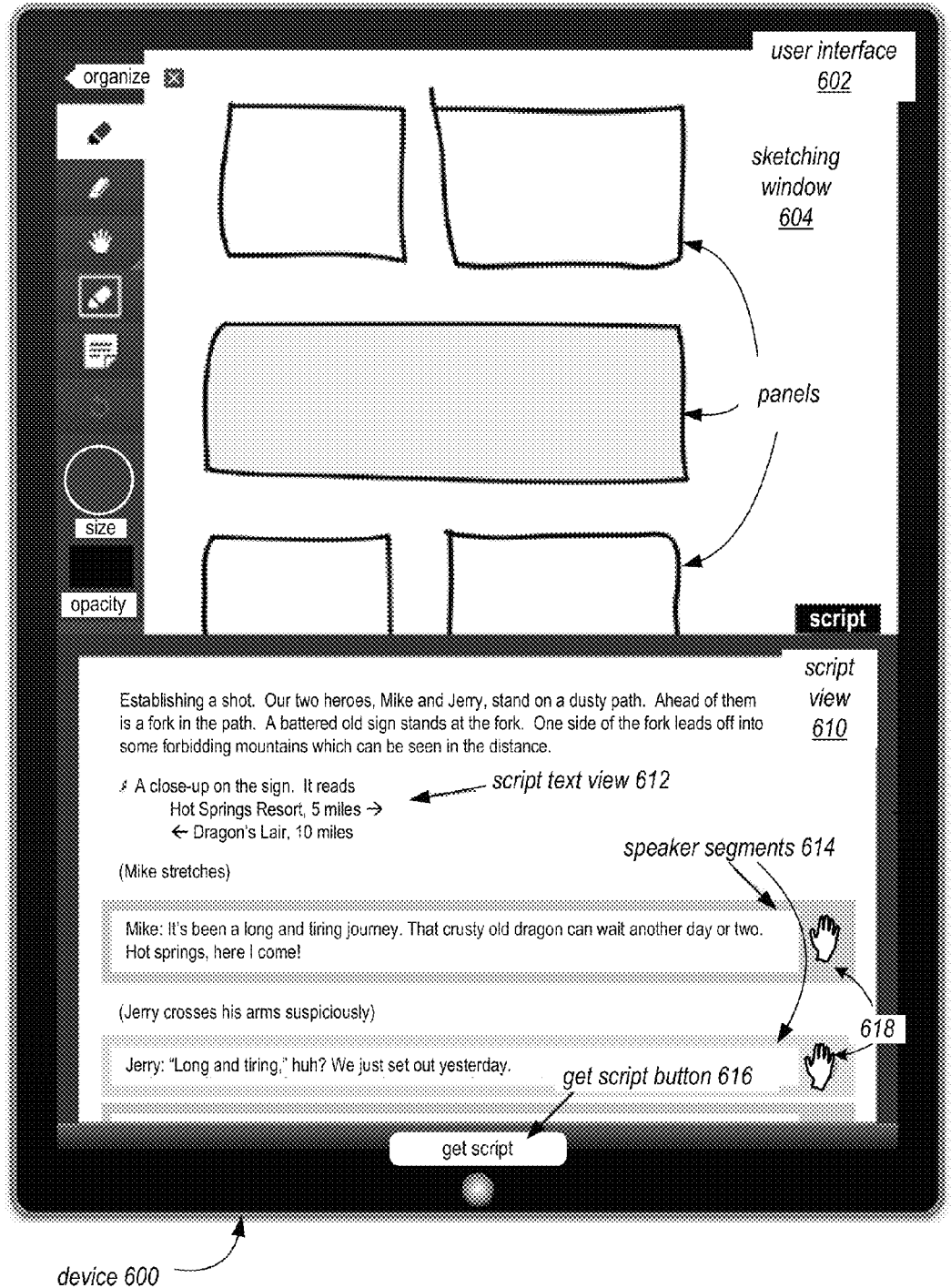
FIG. 7 illustrates an example multitouch device and example user interface to an embodiment of the comic creation application in script view mode.

FIG. 7 illustrates an example multitouch device 600 and example user interface 602 to an embodiment of the comic creation application in script view mode. A script view 610 user interface area may include, but is not limited to, the following user interface features:

Get script button 616—links with or provides access to a local or remote location from which a script is to be downloaded, imported, or otherwise obtained (e.g., a Dropbox™ or similar web storage account) and shows the contents of a "Comic Scripts" or similar directory. In at least some embodiments, any text file can be used as a script.

Script text view 612—an editable view of the currently selected script.

Speaker segment(s) 614—in at least some embodiments, the comic creation application automatically identifies text fragments that correspond to a character's spoken lines and makes these into interactive objects. In at least some embodiments, to add a speaker segment 614 to a panel, the user may touch and hold a user interface element associated with the speaker segment, for example the open hand icon 618 shown to the right of each speaker segment 614, and then drag and drop the text into the page to add the segment to the currently active panel. In at least some embodiments, a text box may automatically be created and appropriately sized for the dropped text in the panel.

Readability Review

Figure 8:
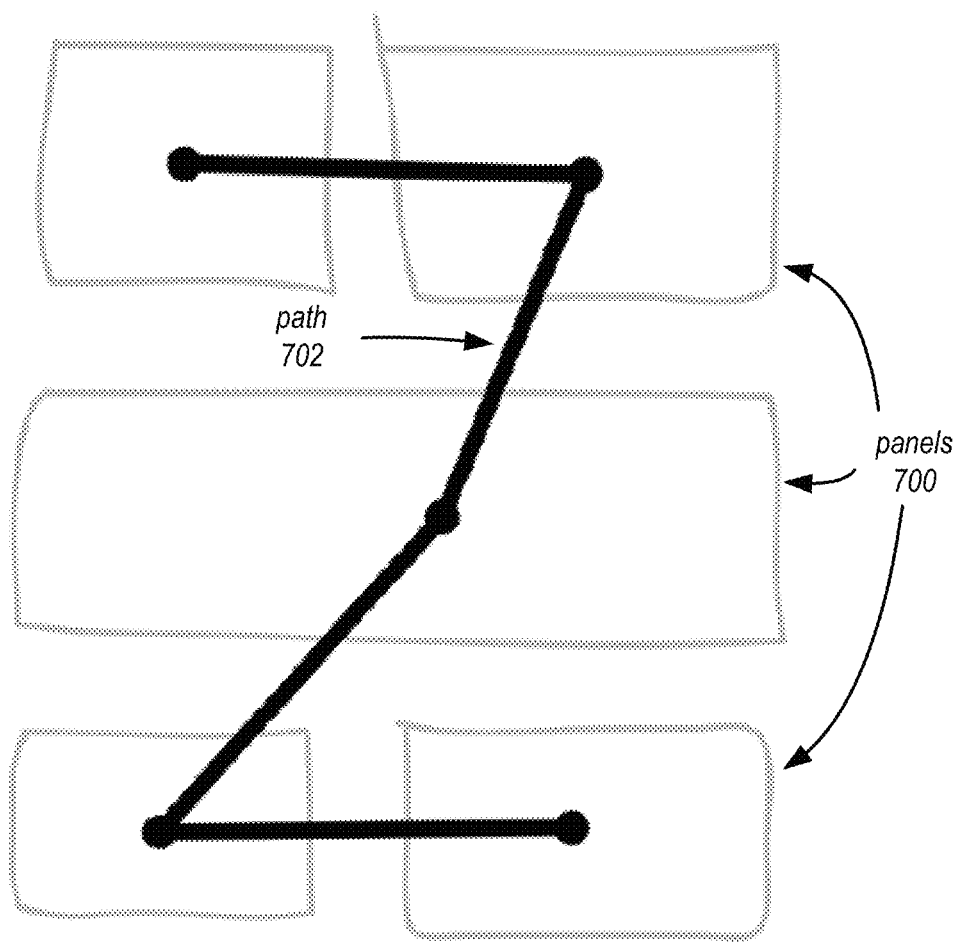
FIG. 8 shows an example path through the panels on an example comic page.
Figure 9:
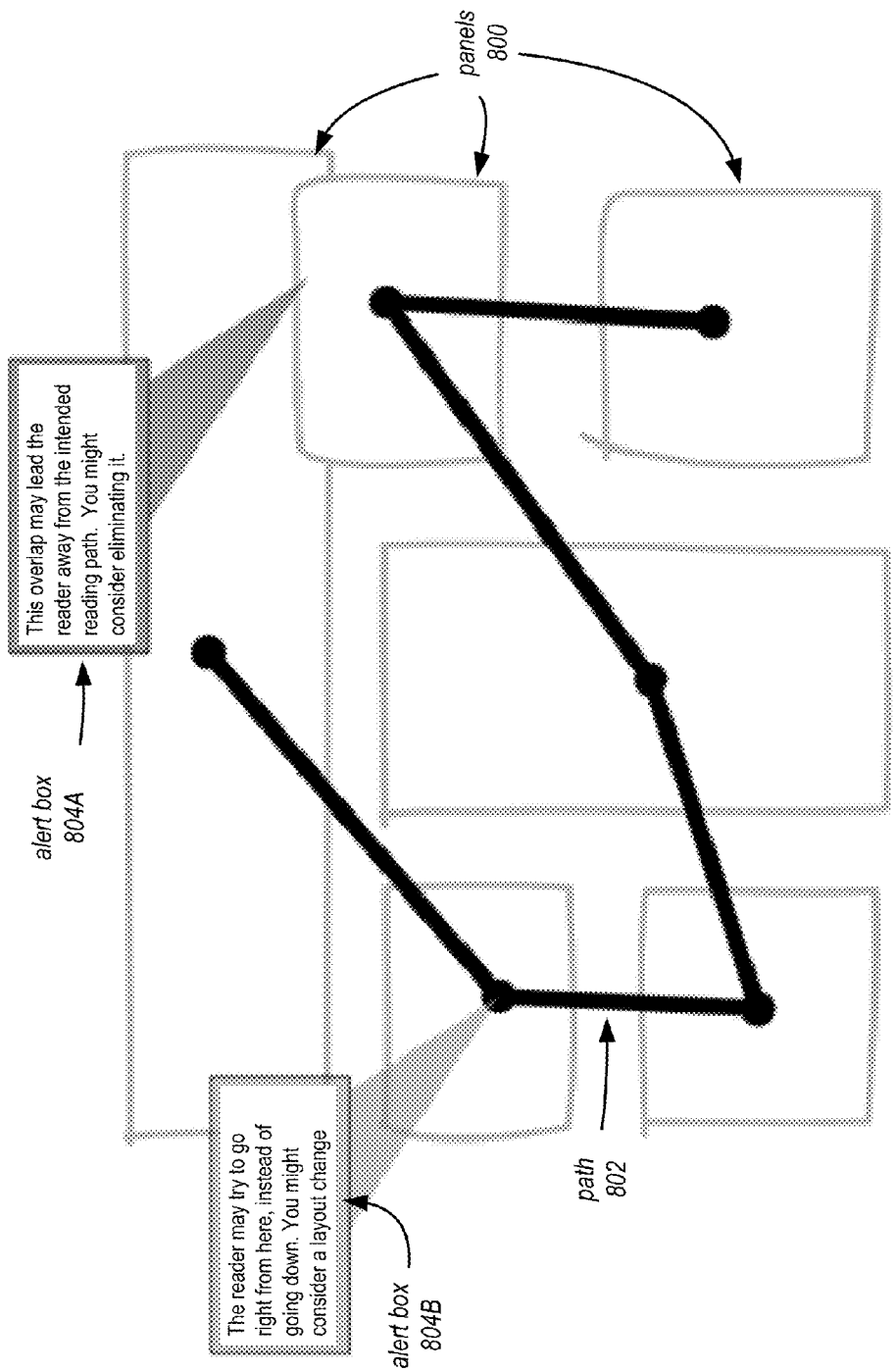
FIG. 9 shows an example path through the panels on an example comic page, and shows two example warnings or alerts that may be displayed to the user.

In the above discussion, the focus has been on creating and editing content. However, with a computational tool, the user's creation can be analyzed, and feedback can be provided. At least some embodiments of the comic creation application may provide a readability review feature that analyzes the placement of panels and text and displays the path a reader's eye will likely take over the page according to heuristics. FIG. 8 shows an example path 702 through the panels 700 on an example comic page. This visualization can help the creator verify that his layout correctly leads the reader through the page. The readability review functionality can also point out areas of potential confusion with special warnings or indications. For example, some layouts have ambiguous points where readers might not know where to go next. As a non-limiting example of such a warning or indication, a dotted line may be used to shown an incorrect path that a reader may try to take. In at least some embodiments, at least some of the warnings or indications can be interactive, for example displaying more information about the problem when tapped or otherwise selected. FIG. 9 shows an example path 802 through the panels 800 on an example comic page, and shows two example interactive warnings or alerts that may be displayed to the user, according to at least some embodiments. Alert box 804A points at a panel that overlaps another panel and messages the user that "This overlap may lead the reader away from the intended reading path. You might consider eliminating it." Alert box 804B points at another of the panels and messages the user that "The reader may try to go right from here, instead of going down. You might consider a layout change."

Figure 10A:
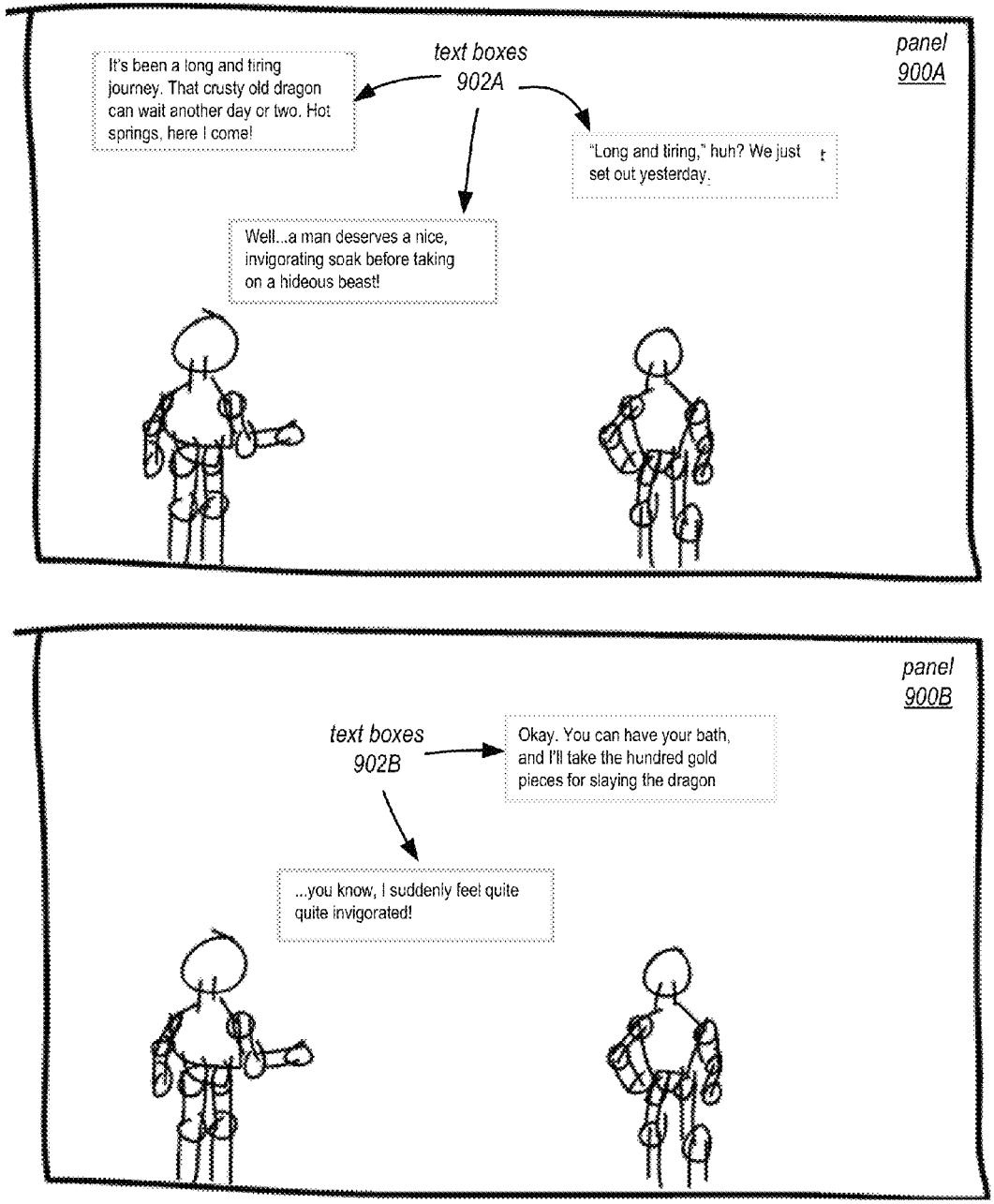
FIGS. 10A and 10B show an example where the readability review function is applied to text boxes within the panels on an example page.
Figure 10B:
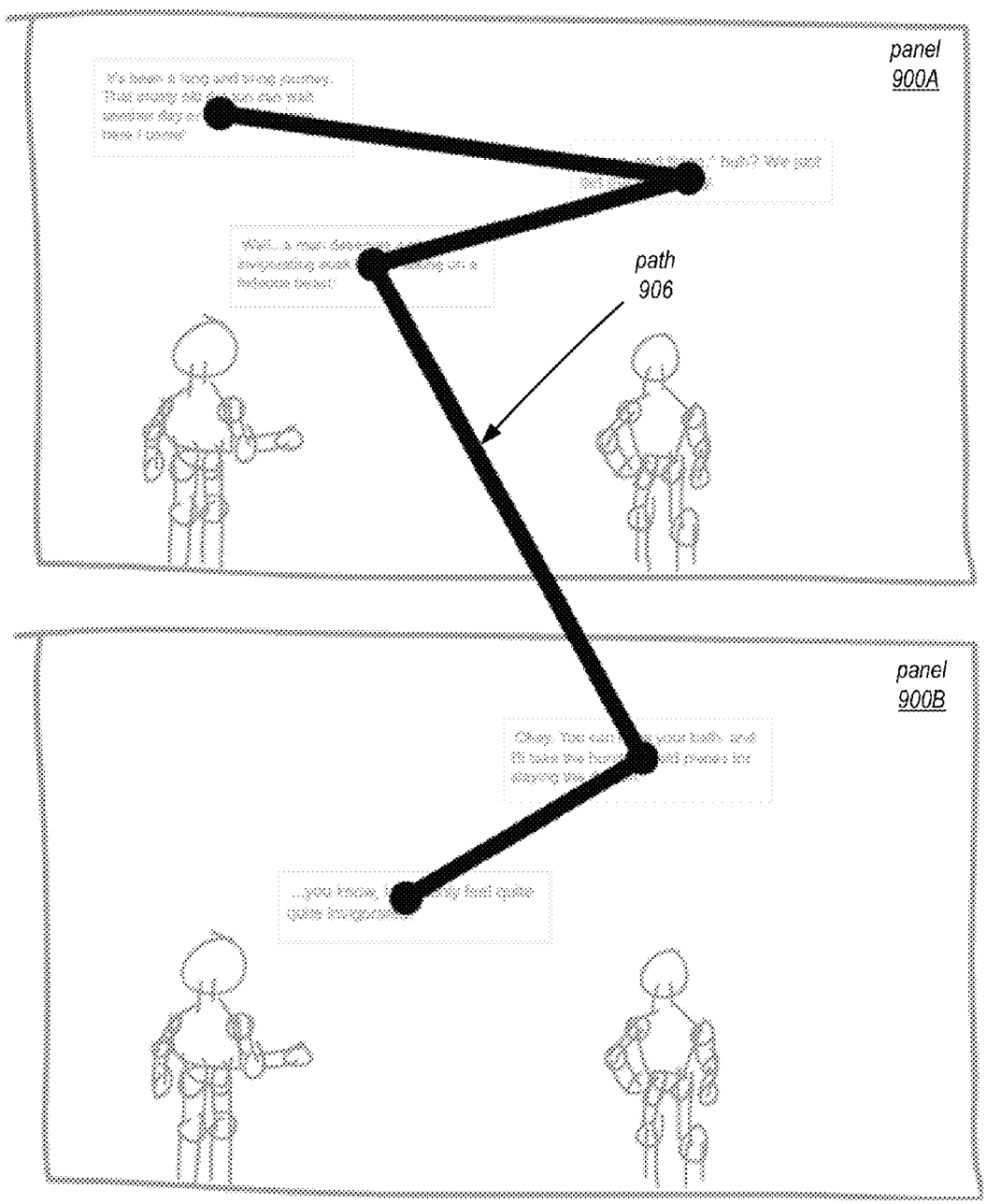

FIGS. 10A and 10B show an example where the readability review function is applied to text boxes within the panels on an example page. FIG. 10A shows an example of a completed comic with two panels 900A and 900B, the two panels including text boxes 902A and text boxes 902B as arranged by the user, respectively. FIG. 10B shows an example path 906 through the text boxes 902A and 902B shown in FIG. 10A. Note that, in this example, the text boxes 902A and 902B, rather than the panels as in the example shown in FIGS. 8 and 9, are treated as nodes to be traversed.

In at least some embodiments, a reading order algorithm may be applied to determine readability. In at least some embodiments, at a high level, the reading order algorithm may attempt to find a path, for example a path that starts at the top-left of the page, ends at the bottom-right of the page, passes through each panel exactly once, and that is "optimal" in some way. Note that, in some embodiments, the path that the reading order algorithm attempts to find may be otherwise defined, e.g. starting at the top-right of the page and ending at the bottom-left. Treating the page as a directed graph, with a node at each panel, this is similar to the traveling salesman problem (TSP). Also note that, in at least some embodiments, the reading order algorithm may instead or also be applied to text boxes within the panels, as shown in FIG. 10B.

In at least some embodiments, the reading order algorithm may use heuristics about the way readers typically read comic pages to define which edges between nodes should exist, and how much they should cost in the TSP framework. Heuristics that may be used and costs that may be considered by the reading order algorithm in at least some embodiments may include one or more of, but are not limited to, the following:

Edge existence
   Edge direction
   Panel crossings
Edge cost
   Base cost
   Cost reduction for overlapping panels
   Cost increase for 'unfinished tiers'

These heuristics are discussed in the following paragraphs in reference to FIGS. 11A through 11F.

FIGS. 11A through 11F graphically illustrate rules that may be used by the reading order algorithm for English-language readers, according to at least some embodiments. Note that the rules may be modified for use in determining readability of comics directed to readers that do not follow the English-language reading model.

Edge Existence

Figure 11A:
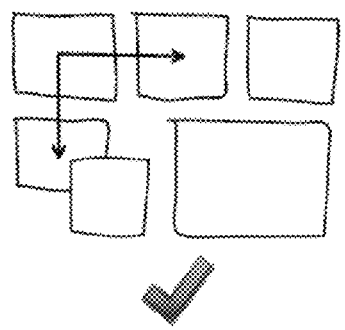
FIGS. 11A through 11F graphically illustrate rules that may be used by the reading order algorithm for English-language readers, according to at least some embodiments.
Figure 11B:
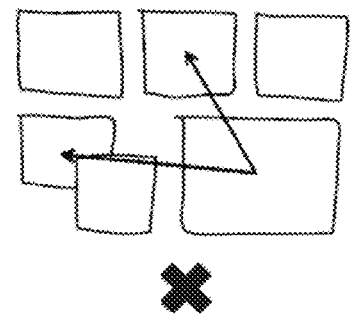
Figure 11C:
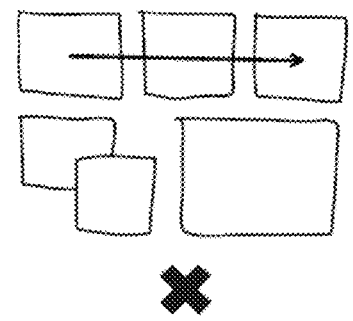

Edges that point down and/or to the right exist in the graph, as shown in FIG. 11A, since English-language readers typically read left-to-right and top-to-bottom. As shown in FIG. 11B, upward and left-facing edges do not exist for English-language readers. Therefore, the reading order algorithm may not consider paths that have upward and left-facing edges. FIG. 11C illustrates panel crossings. An edge between two panels that passes through a third panel will not exist in the graph. This is because no valid reading order forces a reader to skip a panel or read a panel twice.

Edge Costs

Figure 11D:
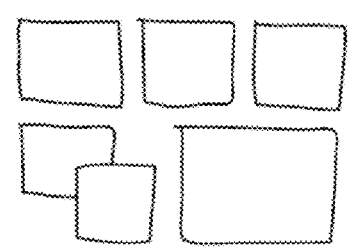
Figure 11E:
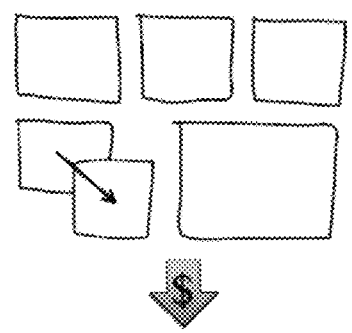
Figure 11F:
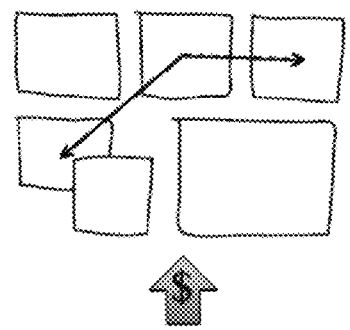

FIG. 11D through 11F illustrate edge costs, according to at least some embodiments. There is a constant base cost for all existing edges (e.g., in the example page illustrated in FIG. 11D), but there may be special circumstances under which an edge costs more or less than the base, as illustrated in FIGS. 11E and 11F. FIG. 11E illustrates cost reduction for overlapping panels. An edge between two overlapping panels receives a cost reduction. When two panels overlap, that is a strong cue that the reader should read them in succession. FIG. 11F illustrates cost increase for "unfinished tiers." Readers generally try to finish all the panels on one horizontal level before moving down to the next one. So any downward edges out of a panel that also has at least one rightward edge will get a cost increase. This expresses the preference that the path finishes with the current horizontal tier before moving down.

Typical pages contain only a handful of panels, so in at least some embodiments the reading order algorithm may solve the traveling salesman problem (TSP) for each panel exactly using a branch and bound approach. The reading order algorithm may then be run again within each panel to get the word bubble (text box) reading order, as well. This implementation may provide feedback on the reading order for panels.

In some embodiments, the actual drawn contents of panels may be included in the reading order analysis. In some embodiments, an eye-tracking technique may be used to obtain eye-tracking data; the eye-tracking data may then be used to analyze the reading order including the actual drawn contents. For example, a crowdsourcing technique may be used where the system recruits online readers, tracks how they read the user's page, and then processes that data and returns it to the user in a simplified form.

Figure 12:
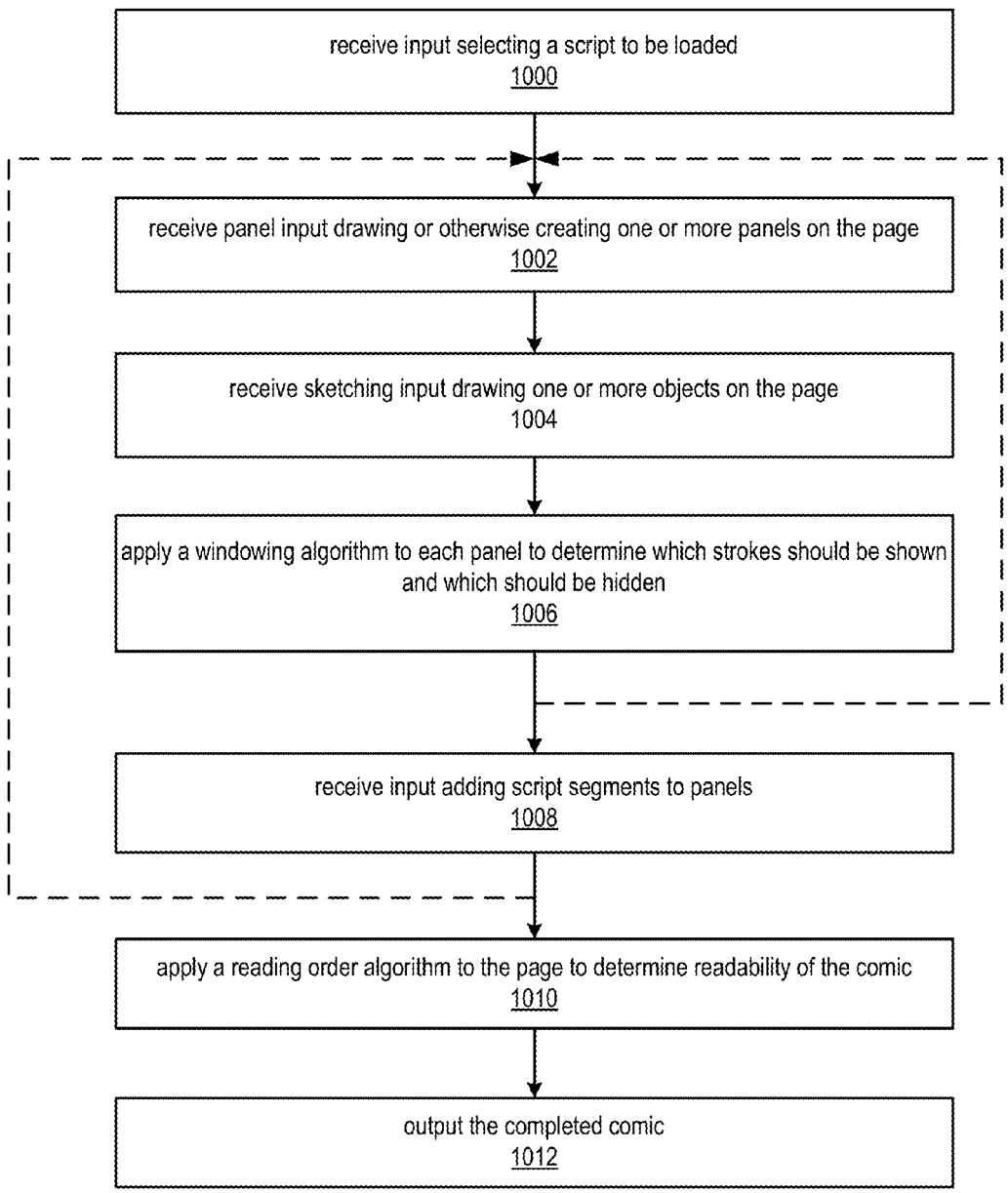
FIG. 12 is a flowchart of an example workflow process that may be performed using the comic creation module or application, according to at least some embodiments.

FIG. 12 is a flowchart of an example workflow process that may be performed using the comic creation module or application, according to at least some embodiments. As indicated at 1000, the comic creation module may receive input selecting a script to be loaded. As indicated at 1002, the comic creation module may receive panel input, the panel input drawing or otherwise creating one or more panels for a comic page in a sketching window. For example, a user may select a panel tool and freehand draw one or more panels on the page, for example using a stylus applied to the touch-sensitive screen of the device. Other methods of creating panels may be provided in some embodiments. As indicated at 1004, the comic creation module may receive sketching input, e.g. freehand strokes, sketching one or more objects (e.g., figures or characters) on the comic page in the sketching window. For example, a user may select a drawing tool such as a pencil, and freehand draw a character or figure at least partially in a panel on the page using a stylus applied to the touch-sensitive screen of the device. As indicated at 1006, the comic creation module may apply a windowing algorithm to each panel to determine which strokes should be shown and which should be considered 'outside' the panel and hidden from view. As indicated at 1008, the comic creation module may receive input adding script segments to panels (e.g., as text boxes). For example, the user may drag-and-drop speaker segments from a script view onto panels in the sketching window (see, e.g., FIG. 7). As indicated at 1010, the comic creation module may apply a reading order algorithm that applies heuristics and costs to determine readability of the panels and/or text boxes of the comic. The comic creation module may determine and display a best path for reading the panels and/or text boxes, and may display one or more warnings or alerts that make suggestions for improving readability. While not shown, the user may modify or rearrange the panels and/or text boxes according to the recommendations, if desired. As indicated at 1012, when the user is done, the comic creation module may output a completed comic. Note that the output comic may be a "rough draft" that the user may use to determine a proper layout and overall design for a final version of the comic, or may itself be a completed comic ready for publishing.

Note that the order of the elements in FIG. 12 may be varied. For example, element 1002 may occur after element 1004. Likewise, element 1000 may occur after element 1002 or 1004. In addition, the steps may be iteratively performed, as indicated by the dashed lines returning from elements 1006 and 1008 to element 1002. In practice, a user may perform the various tasks as indicated herein in almost any preferred order. In addition, while not shown, the user may modify, move, or rearrange the panels and/or text boxes already drawn, if desired, at any time during the workflow.

Example Implementations

Some embodiments may include a means for comic creation. For example, a comic creation module may receive input selecting a script to be loaded, receive input drawing or otherwise creating one or more panels for a comic page, receive input strokes sketching one or more objects (e.g., figures or characters) on the comic page, apply a windowing algorithm to each panel to determine which strokes should be shown and which should be considered 'outside' the panel and hidden from view, receive input adding script segments to panels, and receive input to apply a reading order algorithm to determine readability of the comic, as described herein. Note that other input may be received, for example input to modify one or more objects (panels, sketches, text, etc.) on the page. The comic creation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform at least the above-noted functions of the comic creation module. Other embodiments of the comic creation module may be at least partially implemented by hardware circuitry and/or firmware stored, for example, in a non-volatile memory.

FIG. 13 illustrates a comic creation module that may implement the comic creation techniques and tools as illustrated in FIGS. 1 through 12. FIG. 14 illustrates an example computer system on which embodiments of comic creation module 1100 may be implemented. Comic creation module 1100 may provide a user interface 1102, for example as shown in FIGS. 1 and 7, via which a user may create comic layouts as described herein in reference to FIGS. 1 through 12, for example using a workflow as illustrated in FIG. 12. For example, comic creation module 1100 may receive input 1122 to a displayed page drawing or otherwise creating one or more panels for a comic page (working comic 1120) via a panel creation component 1104, receive input 1122 indicating strokes sketching one or more objects (e.g., figures or characters) on the comic page via a sketching component 1106, receive input 1122 to a text entry component 1106, for example selecting a script 1130 to be loaded or adding text to a panel, apply a windowing algorithm 1110 to each panel to determine which strokes should be shown and which should be considered 'outside' the panel and hidden from view, receive input adding script segments to panels, and receive input to apply a reading order algorithm 1112 to determine readability of the comic, as described herein. Note that other input 1122 may be received, for example input to modify or rearrange one or more objects (panels, sketches, text, etc.) on the page. Module 1100 generates as output a comic 1140. See FIG. 10A for a non-limiting example of what comic 1140 may look like. Note that while FIG. 10A shows the comic in black and white, in practice the comic may be, but is not necessarily, a color comic. Output comic 1140 may, for example, be stored to a storage medium 1150, such as system memory, a disk drive, DVD, CD, etc, displayed on a display device 1170, and/or passed to another module or application 1160 for additional processing.

Example System

Embodiments of a comic creation module and/or of the various comic creation techniques as described herein may be executed on one or more computer systems, which may interact with various other devices. One such computer system is illustrated by FIG. 14. In different embodiments, computer system 1300 may be any of various types of devices, including, but not limited to, a personal computer system, desktop computer, laptop, notebook, or netbook computer, a pad or notepad-type device, an e-book, a cell phone or smart phone, mainframe computer system, hand-held computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, display(s) 1380, and touch- or multitouch-enabled device(s) 1390. In at least some embodiments, at least one display 1380 may include a touch- or multitouch-enabled screen. In some embodiments, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

In some embodiments, at least one processor 1310 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1320 may be configured to store program instructions and/or data accessible by one or more processors 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a comic creation module are shown stored within system memory 1320 as program instructions 1325 and data storage 1335, respectively. In other embodiments, program instructions and/or data may be received, sent or stored upon different types of computer-accessible media or on similar media separate from system memory 1320 or computer system 1300. Generally speaking, a computer-accessible medium may include storage media or memory media such as magnetic or optical media, e.g., disk or CD/DVD-ROM coupled to computer system 1300 via I/O interface 1330. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1340.

In one embodiment, I/O interface 1330 may be configured to coordinate I/O traffic between processor(s) 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor(s) 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. In addition, in some embodiments some or all of the functionality of I/O interface 1330, such as an interface to system memory 1320, may be incorporated directly into processor(s) 1310.

Network interface 1340 may be configured to allow data to be exchanged between computer system 1300 and other devices attached to a network, such as other computer systems, or between nodes of computer system 1300. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or retrieving data by one or more computer system 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

As shown in FIG. 14, memory 1320 may include program instructions 1325, configured to implement embodiments of a comic creation module as described herein, and data storage 1335, comprising various data accessible by program instructions 1325. In one embodiment, program instructions 1325 may include software elements of embodiments of a comic creation module as illustrated in the above Figures. Data storage 1335 may include data that may be used in embodiments. In other embodiments, other or different software elements and data may be included.

Those skilled in the art will appreciate that computer system 1300 is merely illustrative and is not intended to limit the scope of a comic creation module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
generating, by one or more computing devices in response to input, a digital sketch comprising one or more panels, one or more sketches each at least in part included in a respective one of the one or more panels, and one or more textual elements each included in a respective one of the panels, said generating the digital sketch comprising:
generating the one or more panels according to panel input specifying a border for each of the one or more panels on a page;
generating the one or more sketches according to drawing input specifying one or more strokes on the page, at least a portion of the one or more strokes being drawn in at least one of the one or more panels;
erasing a portion of the border for at least one of the panels according to an erase input;
determining for each of the one or more panels, based on a windowing algorithm, which of the one or more strokes or portions of the one or more strokes are to be displayed in the digital sketch and which of the one or more strokes or portions of the one or more strokes are hidden in the digital sketch, the windowing algorithm recognizing the erased portion of the border and said determining that the one or more strokes or portions of the strokes that pass through the erased portion of the border are to be displayed and the one or more strokes or portions of the strokes that do not pass through the erased portion of the border are to be hidden from display, and for a panel, the windowing algorithm performing:
determining at least one of the strokes crosses the border of the panel;
splitting each stroke that crosses the border of the panel to generate at least two separate strokes from the respective stroke;
marking each stroke that lies inside the border of the panel to be displayed;
determining at least one remaining unmarked stroke that intersects a marked stroke; and
marking each remaining unmarked stroke that intersects a marked stroke as to be displayed and additional remaining unmarked strokes are hidden from display.

2. The method as recited in claim 1, wherein the digital sketch is generated according to vector graphics technology.

3. The method as recited in claim 1, further comprising adding the one or more textual elements to respective ones of the one or more panels according to text entry input, said adding the one or more textual elements comprises:
obtaining one or more text files stored as one or more scripts on the one or more computing devices or on one or more remote devices;
displaying the one or more scripts containing text related to the one or more sketches in a script interface; and
integrating selected portions of the text from the script interface to the respective panels in response to the text entry input.

4. The method as recited in claim 3, further comprising:
applying a reading order algorithm to the one or more textual elements in each panel to determine readability of the one or more textual elements according to reading heuristics; and
displaying one or more suggestions for modifications to improve the readability of the one or more textual elements.

5. The method as recited in claim 1, further comprising:
applying a reading order algorithm to the one or more panels to determine readability of the one or more panels according to reading heuristics; and
displaying one or more suggestions for modifications to improve the readability of the one or more panels.

6. The method as recited in claim 5, wherein the reading order algorithm finds a path that starts at one corner of the page, ends at an opposite corner of the page, passes through each panel exactly once, and is optimized according to one or more criteria.

7. The method as recited in claim 1, wherein said generating the digital sketch is performed by a touch-enabled or multitouch-enabled device, wherein at least a portion of the panel input, the drawing input, and the erase input is received via touch or multitouch gestures.

8. The method as recited in claim 1, wherein the panel input specifying the border for each of the one or more panels on the page is freeform sketching input.

9. The method as recited in claim 1, further comprising receiving input modifying one of the one or more panels.

10. The method as recited in claim 9, wherein the input modifying the panel moves, scales, rotates, or deletes the panel, wherein said moving, said scaling, said rotating, or said deleting affects a respective one of the one or more sketches.

11. The method as recited in claim 9, further comprising automatically adjusting at least one other panel on the page in response to modifying the one of the one or more panels.

12. The method as recited in claim 9, wherein the input modifying the panel is an additional erase input erasing a portion of the border of an additional panel, wherein the method further comprises reapplying the windowing algorithm to the additional panel in response to said erasing the portion of the border of the additional panel.

13. A device, comprising:
   a display device configured to display a digital sketch comprising one or more panels, and one or more sketches each at least in part included in a respective one of the one or more panels;
   one or more processors to implement a comic creation module that is configured to generate the digital sketch performing operations comprising to:
      generate the one or more panels according to panel input specifying a border for each of the one or more panels on a displayed page of the digital sketch;
      generate the one or more sketches according to drawing input specifying one or more strokes on the page, wherein at least a portion of at least one of the one or more strokes is drawn in at least one of the one or more panels;
      erase a portion of the border for at least one of the panels according to an erase input;
      determine for each of the one or more panels, based on a windowing algorithm, which of the one or more strokes or portions of the one or more strokes are to be displayed in the digital sketch and which of the one or more strokes or portions of the one or more strokes are hidden in the digital sketch, the windowing algorithm configured to recognize the erased portion of the border and determine that the one or more strokes or portions of the strokes that pass through the erased portion of the border are to be displayed and the one or more strokes or portions of the strokes that do not pass through the erased portion of the border are to be hidden from display, and for a panel, the windowing algorithm configured to:
      determine that at least one of the strokes crosses the border of the panel;
      split each stroke that crosses the border of the panel to generate at least two separate strokes from the respective stroke;
      mark each stroke that lies inside the border of the panel to be displayed;
      determine at least one remaining unmarked stroke that intersects a marked stroke; and
      mark each remaining unmarked stroke that intersects a marked stroke as to be displayed and additional remaining unmarked strokes are hidden from display.

14. The device as recited in claim 13, wherein the comic creation module is configured to add one or more textual elements to respective ones of the one or more panels according to text entry input, the comic creation module configured to perform operations comprising to:
   obtain one or more text files stored as one or more scripts;
   display the one or more scripts containing text related the one or more sketches in a script interface; and
   integrate selected portions of the text from the script interface to the respective panels in response to text entry input.

15. The device as recited in claim 13, wherein the comic creation module is configured to:
   apply a reading order algorithm to the one or more panels or to the one or more textual elements in each panel to determine readability of the one or more panels or readability of the one or more textual elements according to reading heuristics; and
   display one or more suggestions for modifications to improve the readability of the one or more panels or the readability of the one or more textual elements.

16. The device as recited in claim 13, wherein the device is a touch-enabled or multitouch-enabled device, wherein at least a portion of the panel input, the drawing input, and the erase input is received via touch or multitouch gestures.

17. The device as recited in claim 13, wherein the comic creation module is configured to:
   receive an additional erase input erasing a portion of the border of an additional panel; and
   reapply the windowing algorithm to the additional panel in response to said erasing the portion of the border of the additional panel.

18. A non-transitory computer-readable storage medium storing program instructions, wherein the program instructions are computer-executable to implement:
   generating, in response to input, a digital sketch comprising one or more panels, one or more sketches each at least in part included in a respective one of the one or more panels, and one or more textual elements each included in a respective one of the panels, said generating the digital sketch comprising:
      generating the one or more panels according to panel input specifying a border for each of the one or more panels on a displayed page;
      generating the one or more sketches according to drawing input specifying one or more strokes on the page, wherein at least a portion of at least one of the one or more strokes is drawn in at least one of the one or more panels;
      erasing a portion of the border for at least one of the panels according to an erase input;
      determining for each of the one or more panels, based on a windowing algorithm, which of the one or more strokes or portions of the one or more strokes are to be displayed in the digital sketch and which of the one or more strokes or portions of the one or more strokes are hidden in the digital sketch, the windowing algorithm recognizing the erased portion of the border and said determining that the one or more strokes or portions of the strokes that pass through the erased portion of the border are to be displayed and the one or more strokes or portions of the strokes that do not pass through the erased portion of the border are to be hidden from display, and for a panel, the windowing algorithm performing:
         determining at least one of the strokes crosses the border of the panel;

splitting each stroke that crosses the border of the panel to generate at least two separate strokes from the respective stroke;

marking each stroke that lies inside the border of the panel to be displayed;

determining at least one remaining unmarked stroke that intersects a marked stroke; and marking each remaining unmarked stroke that intersects a marked stroke as to be displayed and additional remaining unmarked strokes are hidden from display.

19. The non-transitory computer-readable storage medium as recited in claim 18, wherein the program instructions are further computer-executable to implement:

applying a reading order algorithm to the one or more panels or to the one or more textual elements in each panel to determine readability of the one or more panels or readability of the one or more textual elements according to reading heuristics; and displaying one or more suggestions for modifications to improve the readability of the one or more panels or the readability of the one or more textual elements.

20. The non-transitory computer-readable storage medium as recited in claim 18, wherein at least a portion of the panel input, the drawing input, and the erase input is received via touch or multitouch gestures applied to a touch-enabled or multitouch-enabled device.

21. The non-transitory computer-readable storage medium as recited in claim 18, wherein the program instructions are further computer-executable to implement:

receiving an additional erase input erasing a portion of the border of an additional panel; and reapplying the windowing algorithm to the additional panel in response to said erasing the portion of the border of the additional panel.

\* \* \* \* \*